UNITED STATES PATENT OFFICE.

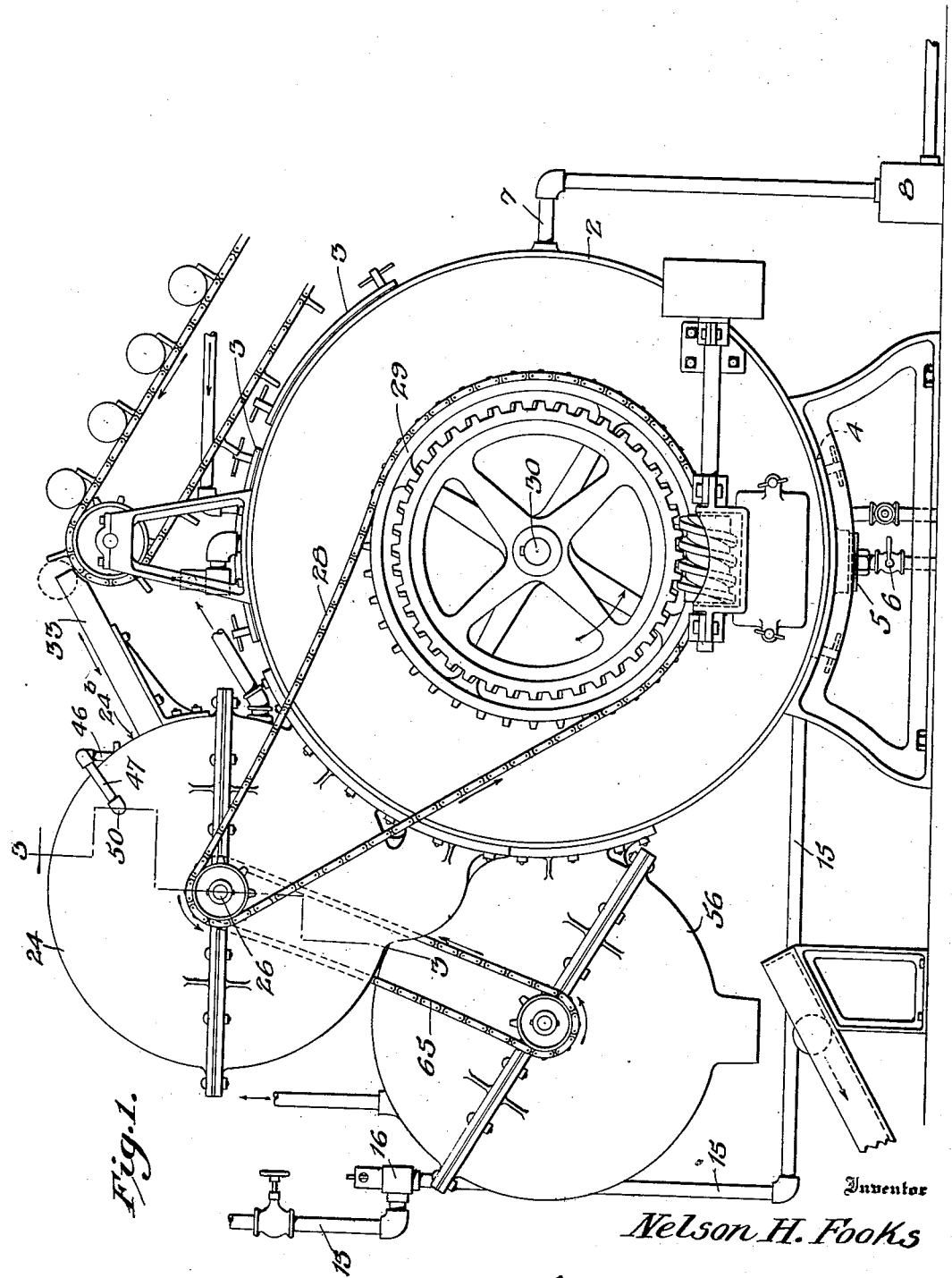

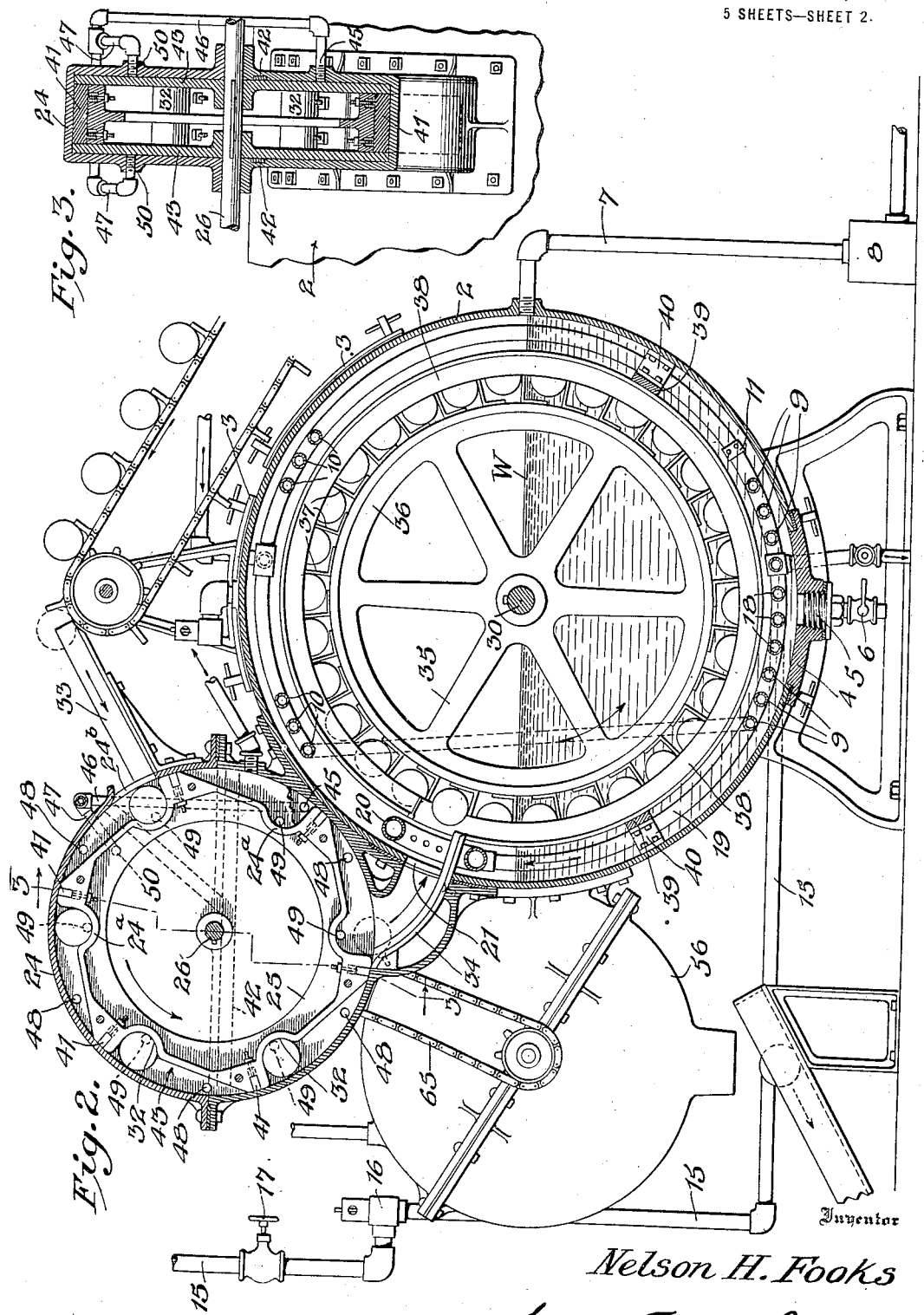

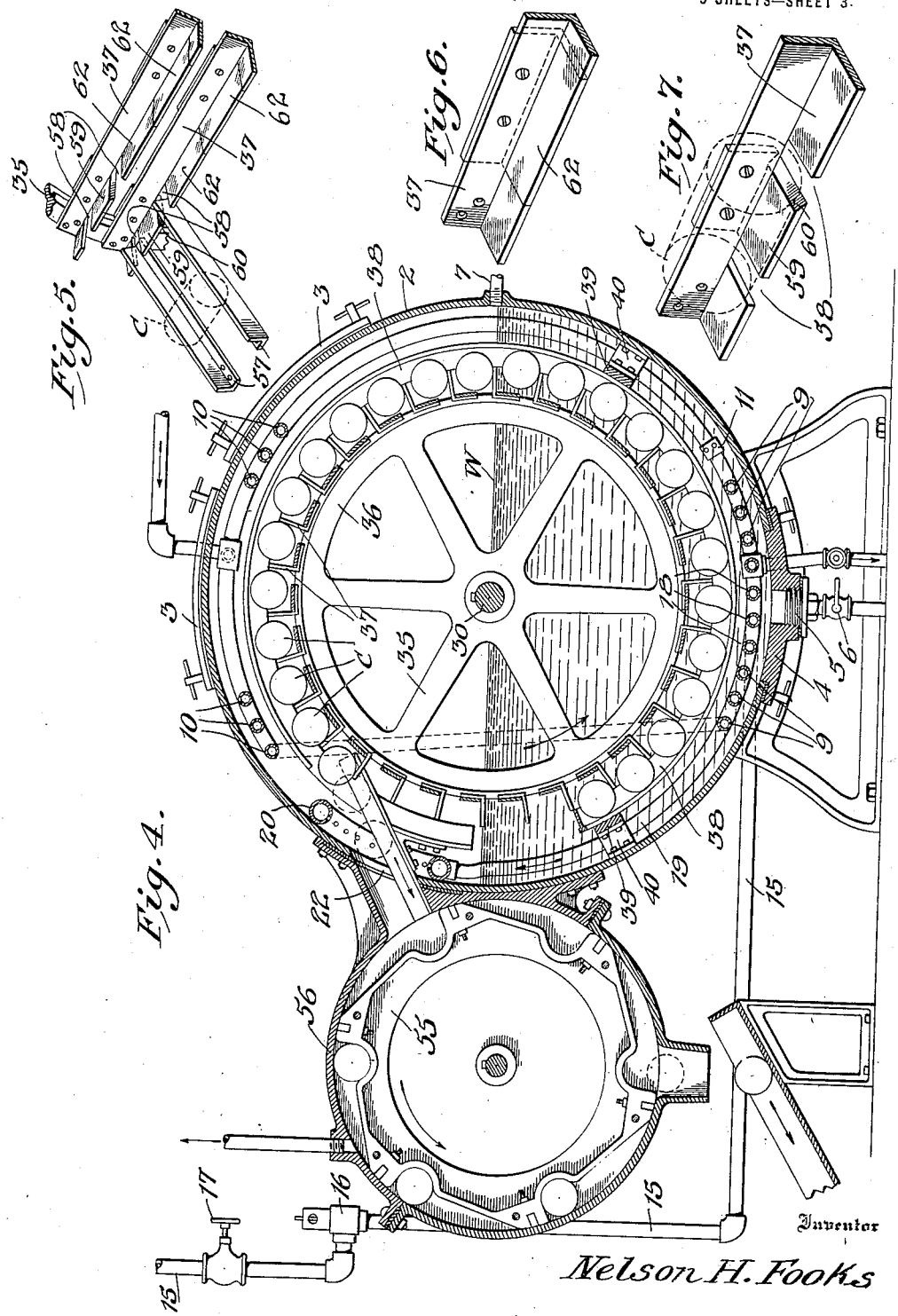

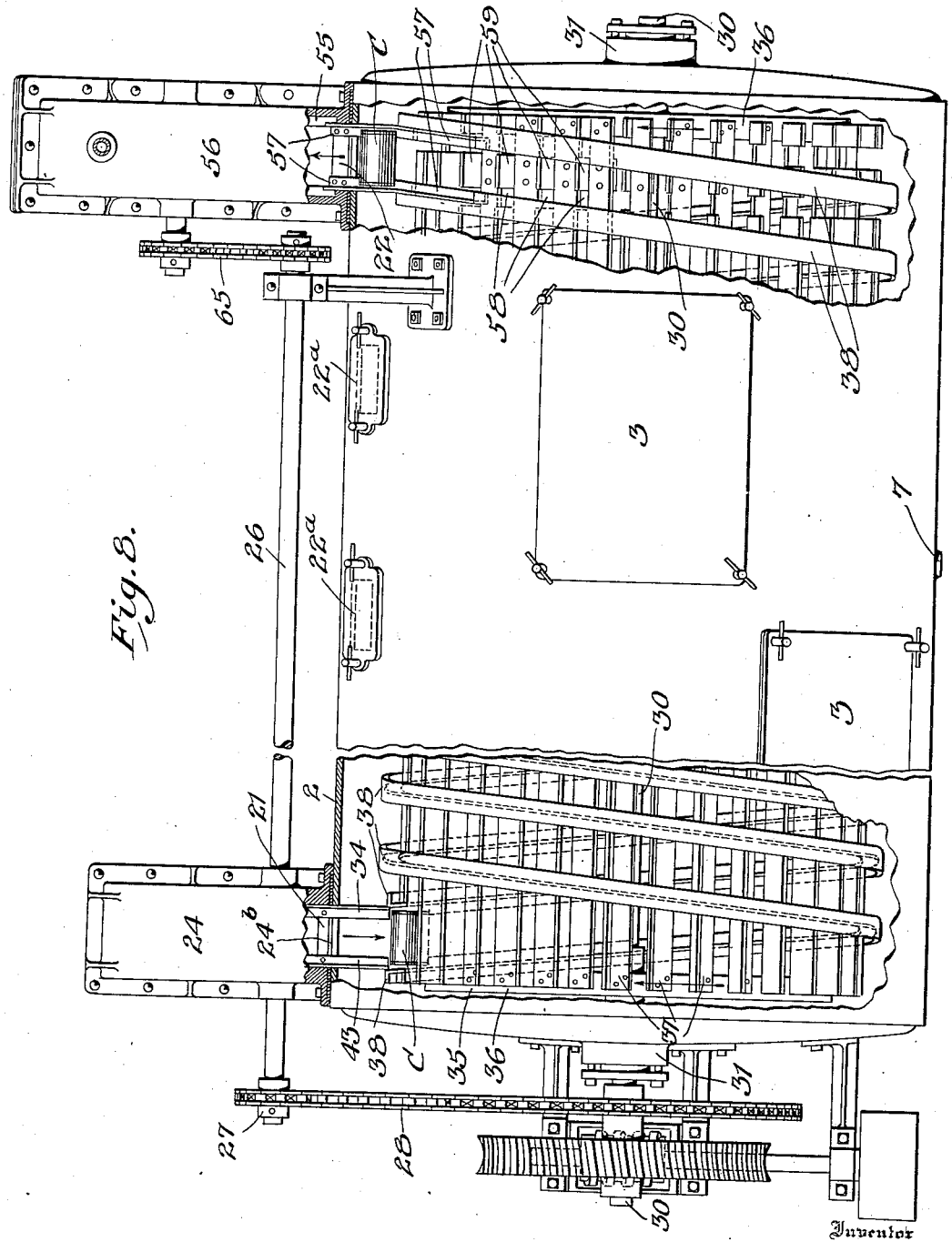

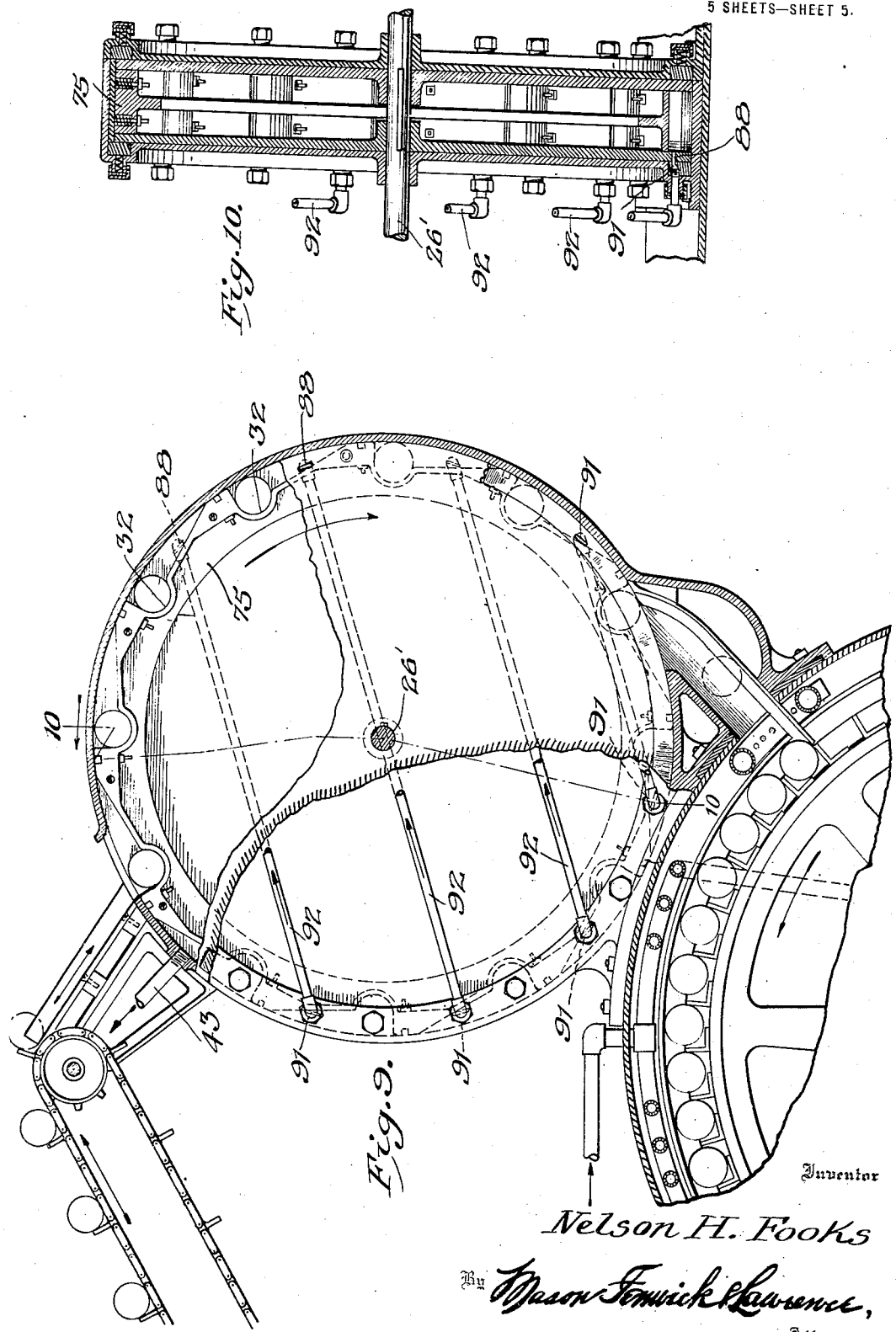

NELSON H. FOOKS, OF PRESTON, MARYLAND.

COOKER.

1,318,985.  Specification of Letters Patent.  Patented Oct. 14, 1919.

Application filed April 8, 1919. Serial No. 288,587.

*To all whom it may concern:*

Be it known that I, NELSON H. FOOKS, a citizen of the United States, residing at Preston, in the county of Caroline and State of Maryland, have invented certain new and useful Improvements in Cookers; and I do hereby declare the following to be a full, clear, and exact description of the invention, such as will enable others skilled in the art to which it appertains to make and use the same.

This invention relates to apparatus for cooking food or other material and particularly to a form of apparatus constructed and arranged so as to continuously transpose sealed containers while the contents thereof are subjected to the desired temperature to sufficiently sterilize or cook the material this work requiring a temperature and a period of treatment varying with the different substances being treated.

It is well known that certain of the common vegetables which are preserved in sealed containers such as tin cans require to be treated different lengths of time according to the toughness of the fiber and cell structure of the material and it has long been a common practice to cook many varieties of material in sealed retorts in which the containers with their contents are subjected to a comparatively high temperature thus reducing the time of cooking as over the process when cooking the same material in so-called open apparatus and in which various forms of mechanism have been introduced so as to continuously feed the containers into and from the open cookers. This continuous feed of the materials in their containers is a great improvement over the so-called closed and higher temperature retorts because it overcomes the necessity of filling racks and the placing the filled racks in the retorts which must then be closed and their temperature raised and then after the cook has finished the temperature must be lowered and when steam is employed, upon the opening of the closed retort a large volume of steam escapes which not only causes a loss of heat but the establishment is rendered most uncomfortable for the employees.

It has been proposed as early as the Smith Patents No. 628554, of 1899, No. 640,234 of 1900, to construct a closed, continuous cooking apparatus in order to combine at once the advantages of the high temperature closed retort and the advantage of the continuous introduction and feed and discharge of the containers.

The Smith patents above referred to disclose ingenious and practicable means for handling the cans when introduced into a closed chamber these means consisting of a fixed helical track-way and a rotatable and slatted or ribbed cylinder or drum between each of the successive slats of which cans could be introduced at one end of the helical fixed tracks so that as the drum or slatted cylinder rotated a can would be carried around therewith and at the same time axially shifted along parallel to the axis of the carrier due to the pitch of the successive turns of the fixed helical track. Smith further discloses means for maintaining a closure at the inlet and outlet of the chamber so as to minimize the loss of steam in the container and by which inlet and outlet means the introduction and discharge of cans was controlled.

The present invention contemplates the utilization of a suitable closed chamber having any suitable carrier in its interior for carrying the cans through a given orbit and also contemplates the use of suitable means for directing their travel through the orbit and a particular object of the present invention is to provide for the economy of the can heating medium or agent and specially to provide for minimizing leakage or wastage of such heating vapors as may be generated in the apparatus. A cardinal object of the present invention is to provide for the subjection of the containers and their contents to any desired degree of temperature with a minimum production of vapor, steam or moisture and at the same time to enable the cooking of the goods for any desired length of time all achieved in a continuously operating apparatus.

Therefore, one of the features of the present invention is the utilization of such a combination of elements as will enable the heating of a quantity of water in a chamber to the desired degree of temperature with the minimum production of steam or vapor by subjecting the water which is being heated and in which the material is cooked to any desired degree of pressure of compressed air. As is well known the boiling point of water increases with an increase of pressure and I utilize this principle in my present invention to reduce the amount of steam generated in the apparatus so that there is a minimum of wastage of steam or moisture owing to the continuous operation of the valves which have the function of keeping the chamber closed and at the same time feeding into and discharging from the apparatus the cans whose contents are to be cooked. For instance by my invention the high temperature which can readily be secured in some closed retorts can be utilized in the present apparatus to secure as quick a cook of the material as the nature of the material permits and also enables the continuous handling of the goods with a minimum loss of heat units and moisture while the operation is proceeding.

Most canned goods or foods in hermetically sealed containers and especially such goods as corn, peas, lima beans, navy beans, all meats and fish, must be cooked under pressure in closed apparatus for long periods because of the toughness of the cell structure and such goods as mentioned can be continuously handled in the apparatus herein disclosed with greater economy than by or in the ordinary process of racking them and placing the racks in the cooker or retort which must be closed and sealed until the cook is finished and then must be opened and rack removed and the goods then taken from the racks.

With the above and numerous other objects in view as will be rendered manifest to those versed in the art, the invention consists in the construction, the combination, and in details and arrangements of parts as more particularly described in the following specification with relation to the accompanying drawings in which—

Figure 1 is an end view of one form of apparatus according to my invention.

Fig. 2 is a vertical, transverse section in a plane through the can feeding valve.

Fig. 3 is a section on line 3—3 of Fig. 1.

Fig. 4 is a vertical, transverse sectional view through the apparatus in a plane passing through the can outlet valve or apparatus.

Fig. 5 is a perspective view of a portion of the can carrier in the chamber showing a form of outlet apparatus to lead the cans from the chamber.

Fig. 6 is a perspective view showing in detail one of the carrier slats to which has been applied a filler to close its outlet gateway.

Fig. 7 is a perspective view of a portion of one of the carrier slats showing a gate in the gate way which coöperates with the outlet conveyer shown in Fig. 5.

Fig. 8 is a plan view of the apparatus partly broken away to show in detail certain parts of the mechanism.

Fig. 9 shows a modified form of the valve arrangement designed for reducing the pressure in a plurality of steps and showing the valve disposed on the casing and related to the upwardly moving sides of the can carrier therein.

Fig. 10 is a section on line 10—10 of Fig. 9.

At the outset it might be stated that I do not desire to be limited to the shape or size of the chamber forming the closure in which the cans are subjected to heat nor do I desire to be limited to any particular construction or means for feeding the cans into and through and from the chamber, nor to be limited to other details which obviously may be changed or reorganized or constructed in various manners as may be desired so long as the organization is kept within the broad purpose of my invention. Similarly no limitation is to be implied by the disposition or relation of the several parts of the organization when the same can be at the will of the mechanic or designer located at any other position or other relation in the apparatus so long as it is possible to utilize the principle of my invention. Therefore, I have shown an apparatus which illustrates the embodiment of an organization in which my invention is employed and in this apparatus I show a cylindrical chamber 2 of any suitable dimensions and method of construction although this may be of any desired shape. The cylinder may be provided at such points as is desired in its upper portions with man holes and covers 3 therefor and in its bottom there may be provided man holes and covers 4 therefor and there may be, and preferable is, provided a drain plug or plugs as shown at 5 to drain the chamber and a drain cock or cocks 6 may be utilized. I prefer to subject the cans or containers, the contents of which are to be cooked, to temperature of the desired degree and for a desired period of time when the containers are passed through the chamber and I prefer that the containers be carried through a body of water which is indicated at W the level of which can be determined in the chamber 2 as desired and maintained by an outlet or outlets 7 to which preferably there is arranged a steam trap 8 which will permit the outflow of water as it reaches the predetermined level but prevents the outflow of the humid air in the chamber.

Preferably the water in the chamber is heated by means of a series of steam pipes or coils 9 here shown as extending along the bottom of the chamber 2 and which if desired may be extended to the upper part of the chamber as indicated at 10 so as to heat the upper portion of the chamber. Water may be supplied to the chamber through any suitable means and a sufficient and practical supply is obtained if the steam heating coils or pipe 9 is provided with a terminal or discharge at any suitable point as at 11 which not only provides, due to the condensation of the steam, a sufficient quantity of replacement water but also provides for the keeping of live steam in the heating coils. Obviously the temperature of the water in the chamber 2 can well be regulated by the temperature of the steam admitted to the heating coils 9.

One of the notable features of my invention resides in the maintenance of air under a suitable degree of pressure in the chamber 2 and above the water level the presence of which is to enable me to cook the goods at a desirable high temperature and with a minimum production of vapor or steam in the chamber 2 and for that reason it is only necessary in order to secure the desired high temperature to introduce into the chamber air at as many pounds pressure above atmospheric pressure as will bear a given ratio to the boiling point of water so as to keep the water at the desired boiling point and thus prevent the excessive production of moisture and steam as would be the case if it were attempted to increase the temperature of the water to get a quick cook if the cooker were of the open type and the water in the cooker subjected only to atmospheric pressure. For example while the steam in the heating coil 9—10 may be introduced say at 300 degrees temperature it is possible to get the water to a boiling point of about 246 degrees if the air pressure in the chamber is raised to about 14 pounds above atmospheric pressure and it will clearly be seen that I can then subject the goods being cooked to a temperature of 246 degrees more or less with a necessary additional pressure of only 14 pounds above atmospheric pressure in order to minimize the amount of steam and moisture produced in the chamber. I have shown an air supply pipe 15 in which may be mounted a safety valve 16 and a control cock 17 between the source of supply, not shown, and the safety valve which latter provides for the automatic escape of air when pressure in the air pipe 15 which is extended into the chamber 2 in the form of a coil 18, is increased owing to the heating of the air in the coil 18. I therefore not only provide for the heating of the water by the steam coils 9 but I also utilize the heat of the water to raise the temperature of the air as it is discharged through the heating coil 18 and discharge pipes 19 connected thereto and in the ends of which are mounted spray heads 20 which are preferably disposed in juxtaposition to the can inlet 21, Fig. 2, and the can outlet 22, Fig. 4. I prefer this disposition of the air spray heads 20 so as to secure the discharge of air in zones adjacent to the inlet and outlet and thereby displace the humid and heated air so that the fresh, incoming air provides a fluid which will escape into the valvular means disposed adjacent to the inlet and outlet and thereby prevent, as far as practically possible, the eduction of the heated and moisture laden air in the chamber 2 and obviously conserve the moisture and eliminate the discharge of the moist air from the apparatus. It being one of the principal objects of the present invention to provide for the continuous operation of the cooker in the introduction, transporting and discharging of the goods to be handled and at the same time to enable the cook at the desired high temperature and at a minimum wastage of heat units and moist air from the apparatus, the above described organization is an example of one type of apparatus.

To secure the continuous passage of containers of goods to be cooked through the apparatus, there is shown arranged at the inlet 21 a valve casing 24 having arranged therein a rotary valve 25 of suitable design and construction, which is secured on and rotated by a shaft 26 extending through the casing and having on its outer end a suitable driving means as for instance comprising a sprocket shaft 27 engaging a sprocket belt 28 which runs over a master sprocket 29 which is keyed or otherwise suitably secured on a shaft 30 extending longitudinally through the chamber 2 and which preferably is mounted in packing glands 31 in the heads of the chamber 2 and on which shaft and in the chamber 2 there is supported and driven a carrier to be described hereafter. The valve 25 is shown as provided on its periphery with a series of can pockets 32 which may be of any suitable number and these pockets are designed to be successively carried past a supply mechanism indicated at 33, Fig. 2, so that cans are successively carried by the pockets 32 while the valve moves in the direction of the arrow thereon to the bottom of the valve casing 24 in which there is provided a track 34 leading into the inlet 21 of the chamber 2 and from which track the cans successively pass into the carrier 35. This carrier is shown as comprising a suitable number of supporting wheels 36 appropriately spaced apart and secured on the shaft 30 and on the rims of these wheels there are secured longitudinally extending slats or shelves 37 here shown as in the form of angle irons as of suitable dimensions between the radial flanges on which there are formed annular pockets of sufficient width to provide for the reception of the cans C as they enter into the inlet 21. As the can carrier 35 rotates in the direction of the arrow thereon, Fig. 2, the cans are caused to be shifted longitudinally along their supporting slats or shelves 37 by a device comprising a helical track way 38 being shown in the present instance as a T-iron secured with its web or central flange directed inwardly toward the wheels of the carrier while the head of the T-iron is shown as secured at suitable intervals along rests 39 in the form of longitudinally extending flat bars which are spaced from the wall of the chamber 2 on supporting brackets 40 of which a suitable number is provided.

It is desirable that the wastage of moist, compressed air from the chamber 2 be kept as low as practicable and to that end the valve 25 is shown as provided with any suitable transverse packing means on its periphery as indicated at 41 to make a packing joint with the cylindrical inner surface of the casing 24 and also other packing may be employed as indicated in Fig. 3, extending across the flat circular sides of the valve 25 this packing being shown at 42 and bearing on the side disks 43 of the valve member, these disks having as snug a fit as practicable in the casing 24. Clearly, as each of the can pockets 32 passes the inlet 21 and a can rolls from the lowermost pocket onto the trackway 34 and runs onto the registering slat of shelf 37, coming into position at the end of the track 24, a quantity of the moistened and heated air passes into the registering pocket 32 and as the valve 25 rotates, two of the high points with the packings 41 pass onto the curved portion 24ª of the casing and there is therefore contained in this pocket a quantity of the compressed air at the same pressure as that in the chamber 2. In order to reduce the wastage of pressure and moisture which will occur if each pressure laden pocket communicates with the atmosphere, I prefer to exhaust a part of this pressure from the pocket covering the surface 24ª to another pocket in the valve 25, which contains air at only atmospheric pressure and this I accomplish by providing an outlet port 45 in the side of the casing and adjacent to the part 24ª thereof and from this port I lead a pipe 46 to the upper part of the casing and branch it at 47, leading the branches as clearly shown in Fig. 3 to the sides of the casing 24 and tap in at 50 so that the pressure from the pocket at 24ª is allowed to pass into a pocket which passes under the upper portion of the casing 24 just after the pocket has been supplied with a can from the feed chute 33 and after the trailing packing 41 passes under and closes the intake mouth 24ᵇ of the casing 24. In order to permit the eduction of the pressure from the pockets 32 as they successively register with the outlet port 45, the side disk 43 of the valve is provided with a plurality of outlet ports 48 designed to register with the outlet port 45 and as this registration occurs the compressed air passes therethrough and is admitted into the upper pocket from the branches 47 by ports 49 which register with the ports 50 where the branches 47 are tapped into the sides of the casing 24. It is obvious that as soon as the ports 48 pass out of register with the port 45 these ports cut off the flow of fluid and owing to the intercommunication between the pockets 32 the pressure in the two intercommunicating pockets has been equalized with the result not only of conserving the heated air and moisture by reducing the amount that would pass out of the exhaust pipe 43, but further by introducing the pressure into the upper pocket passing over the inlet 24ᵇ accomplishing the desired result of placing the can in this pocket under an initial pressure which is less than the pressure in the chamber 2; and moreover by charging the upper pockets as they pass beyond the can intake opening 24ᵇ secure the advantage of balancing the valve 24 against the pressure in the pockets passing from the passageway 21.

Manifestly, the can feed valve mechanism can be located in any desired point along or on either side of the wall or chamber 2 as the circumstances may make it desirable.

After the cans have been advanced by the coöperation of the slats 37 on the carrier 35 and the helical track way 38 they are successively brought into register with an outlet or number of outlets such as shown at 22 in Fig. 4, and through which the cans are successively led by a suitable outlet means and into the outlet can conveying valve 55 which is generally similar to the feed valve 25 and which outlet valve 55 is arranged in an appropriate casing 56 secured by suitable means to the chamber 2 to register with an outlet opening 22 of which there may be any suitable number located at any desirable position along the wall of the chamber 2. To facilitate the escape of the cans from the mechanism in the chamber 2 I have shown a simple device which is clearly illustrated in Figs. 5, 6 and 7 and involves a track way 57 in the form here illustrated of a pair of angle iron fingers or rails which extend through the outlet 22 in which they may be arranged, the inner ends of the rails 57 being adapted to register with a cut-away portion 58 in each of the slats 37, these cut-away portions being located in coördination with each of the outlets 22 if more than one is provided. The track rails 57 are designed to be set at any of the given outlets 22 at which it may be desired to discharge the can. As the cans are shifted longitudinally along a slat 37 as shown in Fig. 7, the opening 58 in each slat is provided with a gate portion 59 preferably removably connected to the slat 37 and one end of the gate 59 is beveled at 60 upwardly and rearwardly in the direction of the movement therealong of a can C so that the end of the can will not be encountered and the can accidentally stopped by the shoulder 60. The gate 59 is of less length than the gateway 58 and thus provides openings at each end for the clearance of the rails 57 which project sufficiently toward the bases of the slats 37 so as to cause a can, as shown in Fig. 4, to pass onto the bottom flanges of the rails 57 as the radial flanges of the slats 37 pass the ends of the rails 57. As soon as the extreme edge of the gate 59 passes the horizontal portions of the rails 57 then the can is permitted to pass outwardly being guided by the side flanges of the rails 57 it being obvious that the contiguous base portion of the T-rail 38 is cut away so as to permit the can to pass freely therebetween as shown in Fig. 8. When the container or chamber 2 is provided with more than one outlet 22 and the outlet valve mechanism 55 is adjusted over one of them, the others are closed by a suitable cover 22ª and in order to close the gateways 58 in the carrier slats 37 so that the cans C can pass over the closed gateways to the next and open gateway, I employ a simple filler or attachment in the form of a plate illustrated clearly in Fig. 6 showing the plate 62 which is of a length equal to the gateway 58 and thus closes the gateway completely and the cans can then pass without interruption along the slat 37 on which it is resting.

Obviously the main shaft 30 may be driven by any suitable driving mechanism and it is shown as here connected in proper timed relation to the valve shaft 27 which is extended along the side of the cooker chamber 2 and is provided with a suitable sprocket wheel and chain organization indicated in Fig. 1 at 65 so as to drive the shaft of the outlet valve 55 in proper time.

In the form of the valve construction illustrated in Figs. 9 and 10, a modification is shown in which the wheel is designated as 75 and is secured on its shaft 26', in this case the wheel being provided with twelve of the expansion chambers or can receiving pockets 32 for the purpose of enabling the reduction of the pressure from the higher pressure chamber in a multiplicity of successive steps or stages so that the pressure passing from the higher pressure side as in the chamber 2 and into one of the pockets will be reduced very materially before it reaches the outlet opening or the exhaust port 43 of the valve casing. Conversely, by reducing the pressure in successive stages as one of the pockets passes toward the exhaust port the pressure is expanded into another pocket or pockets moving from the exhaust port toward the can outlet of the casing 78. This successive reduction in multiple stages and in gradually decreasing degrees of pressure, I accomplish by providing in each of the pockets 32, one or more outlet ports as 88 designed to register with complementary ports 91 formed in a packing ring 86 and which packing ring is connected from one side to the other by transfer pipes in suitable arrangement and designated at 92, and by which pressure from a charged pocket passing from the higher pressure or chamber side of the casing, is transferred to a pocket on the relative, or opposite side of the casing and led into a pocket moving away from the exhaust and toward the high pressure passageway 21.

In Fig. 9 the modified form of valve structure is shown as arranged in such position on the chamber 2 as to discharge cans onto the conveyer slats as they are moving upwardly, when such arrangement is so desired.

Reference is directed to applicant's copending application Serial Number 288,588, filed April 8th, 1919, relative to subject matter disclosed but not claimed in the present application.

What I claim is—

1. In a continuously operating cooker of the closed type, a chamber with co-acting can feeding apparatus and valves to close the can inlet and outlet openings of the chamber, the container designed to hold water to a predetermined level, means for heating the water so that the contents of cans passed therethrough will be cooked; and means for forcing air into the chamber so that the boiling point of the water may be controlled by the pressure of air in the chamber and thereby enable the cooking with high temperature and with a minimum production of vapor or steam.

2. In a continuously operating cooker of the closed type, a chamber with co-acting can feeding apparatus and valves to close the can inlet and outlet openings of the chamber, the container designed to hold water to a predetermined level, means for heating the water so that the contents of cans passed therethrough will be cooked; and means for forcing air into the chamber so that the boiling point of the water may be controlled by the pressure of air in the chamber and thereby enable the cooking with high temperature and with a minimum production of vapor or steam, said air supply means including parts so arranged as to derive heat from the water heating source.

3. In a continuously operating cooker of the closed type, a chamber with co-acting can feeding apparatus and valves to close the can inlet and outlet openings of the chamber, the container designed to hold water to a predetermined level, means for heating the water so that the contents of cans passed therethrough will be cooked; and means for forcing air into the chamber so that the boiling point of the water may be controlled by the pressure of air in the chamber and thereby enable the cooking with high temperature and with a minimum production of vapor or steam, the air supplied also reducing the loss of vapor.

4. In a continuously operating cooker of the closed type, a cooking chamber; can feeding, transporting and discharging mechanism including members to carry cans and forming inlet and outlet valves; means for holding water in the chamber to a predetermined level; means for heating the water; and means for forcing air into the chamber to minimize the wastage of vapor by replacement thereof at the can inlet and outlet ports of the chamber.

5. In a continuously operating cooker of the closed type, a cooking chamber; can feeding, transporting and discharging mechanism including members to carry cans and forming inlet and outlet valves; means for holding water in the chamber to a predetermined level; means for heating the water; and means for forcing heated air into the chamber to minimize the wastage of vapor by replacement thereof at the can inlet and outlet ports of the chamber.

6. In a continuously operating cooker of the closed type, a cooking chamber; can feeding, transporting and discharging mechanism including members to carry cans and forming inlet and outlet valves; means for holding water in the chamber to a predetermined level; means for heating the water; and means for forcing air into the chamber to form a pressure above atmospheric with a minimum of vapor generation by the heating of the water to temperatures above 212 degrees.

7. In a continuously operating cooker of the closed type, a cooking chamber; can feeding, transposing and discharging mechanism including members to carry cans and forming inlet and outlet valves; means for holding water in the chamber to a predetermined level; means for heating the water; and means for forcing air into the chamber to form a pressure above atmospheric with a minimum of vapor generation by the heating of the water to temperatures above 212 degrees, the air introducing means including nozzles arranged adjacent to the inlet and outlet openings so that the incoming air fills the openings to reduce the outflow of moisture laden air from the chamber.

8. In a continuous cooker, a rotary carrier having longitudinal slats forming radial supports for cans, each slat having a number of gateways designed to coöperate with an escape track when set thereat, the gateways being in respective planes around the carrier, and gates attachable to the slats in the gateways in a given plane to form continuations of the support between the rails of the track.

9. In a continuous cooker, a rotary carrier having longitudinal slats forming radial supports for cans, each slat having a number of gateways designed to coöperate with an escape track when set thereat, the gateways being in respective planes around the carrier, and gates attachable to the slats in the gateways in a given plane to form continuations of the support between the rails of the track, and filler members to replace the gates and close the gateways to fill the gateway so that cans can slide along without interruption.

10. In a continuous cooker, a rotary carrier having slats forming supports for cans, each slat having a number of gateways designed to coöperate with an escape track when set thereat, the gateways being in respective planes around the carrier, and gates attachable to the slats in the gateways in a given plane to form continuations of the support between the rails of the track.

In testimony whereof I affix my signature.

NELSON H. FOOKS.